United States Patent
Harvey et al.

(10) Patent No.: US 7,549,078 B2
(45) Date of Patent: Jun. 16, 2009

(54) REDUNDANCY IN ROUTING DEVICES

(75) Inventors: Kendall Harvey, Sunnyvale, CA (US); Paul Kwok, Sunnyvale, CA (US)

(73) Assignee: Alcatel Lucent, Paris (FR)

( * ) Notice: Subject to any disclaimer, the term of this patent is extended or adjusted under 35 U.S.C. 154(b) by 377 days.

(21) Appl. No.: 11/345,259

(22) Filed: Jan. 31, 2006

(65) Prior Publication Data
US 2007/0180311 A1    Aug. 2, 2007

(51) Int. Cl.
*G06F 11/00* (2006.01)
(52) U.S. Cl. .............................. 714/4; 714/12; 714/20; 370/216
(58) Field of Classification Search ..................... 714/4, 714/12, 20
See application file for complete search history.

(56) References Cited

U.S. PATENT DOCUMENTS

| | | | |
|---|---|---|---|
| 6,496,940 B1 * | 12/2002 | Horst et al. ..................... | 714/4 |
| 7,003,692 B1 * | 2/2006 | Banks et al. .................. | 714/12 |
| 2003/0198221 A1 * | 10/2003 | Kim et al. ..................... | 370/389 |
| 2005/0213498 A1 * | 9/2005 | Appanna et al. ............. | 370/216 |
| 2006/0018253 A1 * | 1/2006 | Windisch et al. ............ | 370/216 |
| 2007/0014231 A1 * | 1/2007 | Sivakumar et al. .......... | 370/216 |
| 2007/0086461 A1 * | 4/2007 | Ward et al. ................... | 370/392 |
| 2007/0162565 A1 * | 7/2007 | Hanselmann ............... | 709/219 |

* cited by examiner

*Primary Examiner*—Scott T. Baderman
*Assistant Examiner*—Loan Truong

(57) ABSTRACT

Providing redundancy between an active component and a standby component in a network router comprises maintaining a first route input information base associated with the active component, synchronizing with the first route information base a second route input information base associated with the standby component, generating a route output information base using the second route input information base, and comparing the generated route output information base, in the event of switchover of the standby component to an active mode, to a synchronized route output information base associated with the standby component which synchronized route output information base reflects routes known to have been shared with one or more peers by the active component prior to the switchover, and sharing and/or withdrawing routes as necessary to reflect any differences between the generated route output information base and the synchronized route output information base.

39 Claims, 12 Drawing Sheets

REDUNDANCY IN ROUTING DEVICES

FIELD OF THE INVENTION

The present invention relates generally to network communications. More specifically, providing redundancy in networking devices is disclosed.

BACKGROUND OF THE INVENTION

Data communication networks have become a critical part of the global communications infrastructure. The reliability of routing devices used to connect separate networks has also become very important. Some of the existing routing devices address the reliability issue by using redundant routing processes. Typically, an active process performs the specified routing operations while a redundant process stands by. In the event that the active process fails, the redundant process takes over the duties of the active process. Due to the complex nature of routing protocols such as Border Gateway Protocol (BGP), many existing solutions tend to be complicated and expensive to implement. For example, one important aspect of redundancy is data synchronization. Attempts to directly synchronize routing data between the active and the redundant processes often require extensive modifications to the protocol implementation. Imperfect data synchronization may cause service disruption when activity switch occurs.

It would be desirable to have a way to provide redundancy in routing devices that would reduce service disruption during activity switch. It would also be useful if redundancy can be implemented more simply, without requiring significant changes to the implementation of routing protocols.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing network router redundancy is described. In some embodiments, redundancy is provided using an active component and a standby component. A first input information base associated with the active component and a second input information base associated with the standby component are maintained. An output information base is generated using the second input information base. In some embodiments, the active and standby components include applications. For example, the active and standby components may each include a routing application such as a BGP application. In some embodiments, the active and standby components include Transport Control Protocol (TCP) queues that are synchronized. The standby TCP queue is monitored and updated when appropriate. In some embodiments, when activity switch takes place such that the standby component becomes the active component, another output information base is generated based on the second input information base. This new output information base is compared with the first output information base, and route updates are sent to peer devices based on the difference as appropriate.

Figure 1:
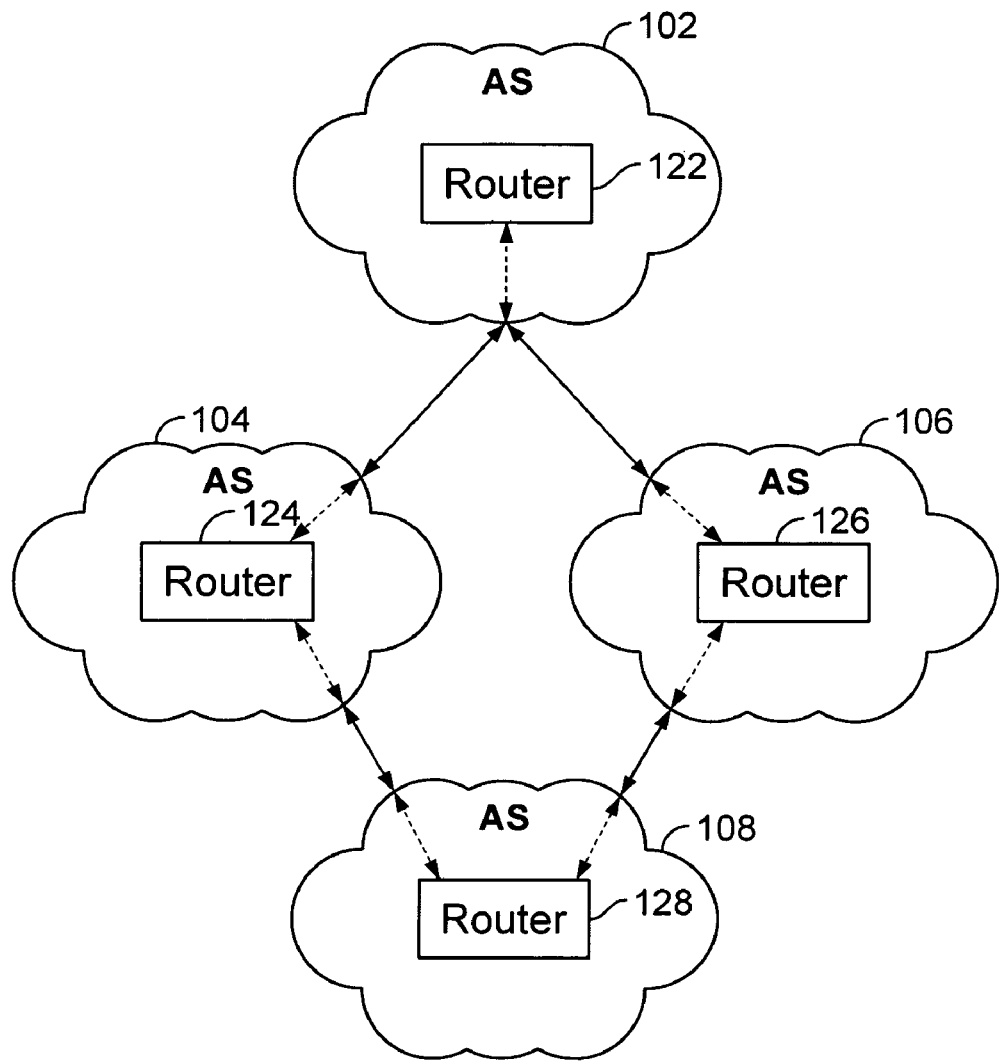
FIG. 1 is a block diagram illustrating connectivity between autonomous systems.

FIG. 1 is a block diagram illustrating connectivity between autonomous systems. An autonomous system is a network that may include routers, computers, network-attached peripherals, and interconnections. An autonomous system (AS) may be associated, for example, with a particular enterprise, service provider, or other entity. In the example shown, autonomous systems 102, 104, 106 and 108 are associated with routers 122, 124, 126 and 128, respectively. Between autonomous systems, an exterior routing protocol such as Border Gateway Protocol (BGP) is used to exchange route information and direct traffic. For example, although AS 102 has no direct connection to AS 108, both AS 104 and AS 106 are directly connected to AS 108. Router 122 of AS 102 is informed of these available connections by routers 124 and 126 using BGP. Route information received (including available routes and path attributes such as transmission time) is stored in an input route information base (RIB_IN) on router 122 to enable router 122 to make routing decisions. In some embodiments, router 122 is configured to share the route information with its peers according to a set of policies. For example, the policies may allow router 122 to inform router 124 that a connection to AS 108 is available via AS 106 but may prevent router 122 from notifying router 126 that a route is available via AS 104. An output route information base (RIB_OUT) is maintained by the router to track routing information sent to peer devices.

Figure 2:
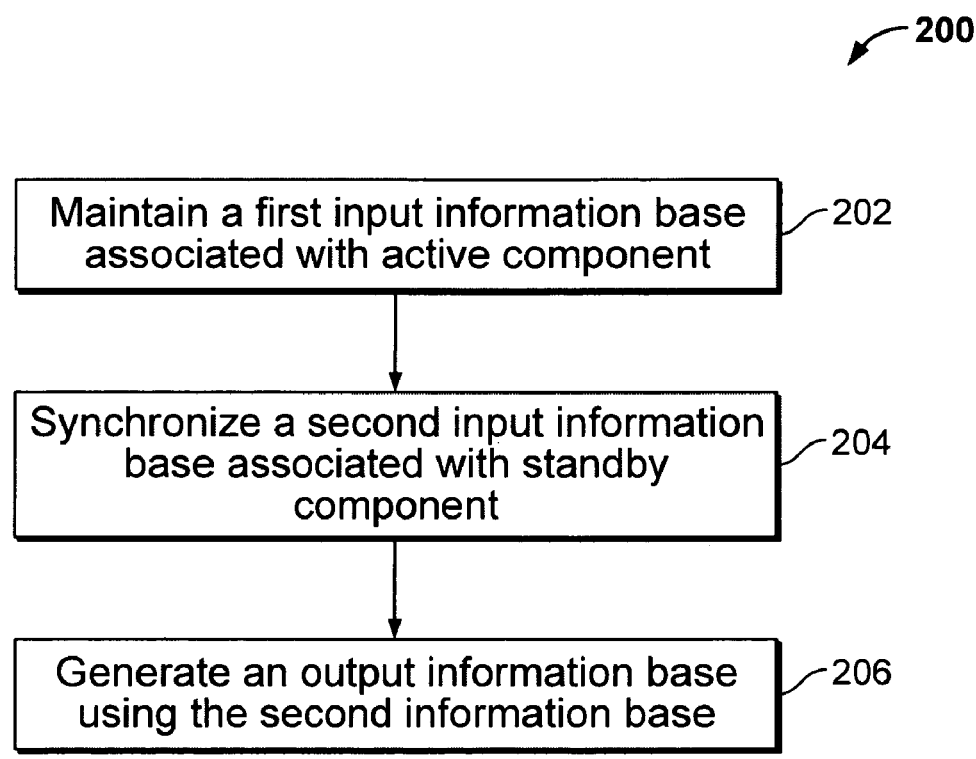
FIG. 2 is a flowchart illustrating the operations of a routing device embodiment that implements redundancy.

In some embodiments, redundancy is built into a router to improve its reliability. A router that implements redundancy includes several modules with similar capabilities. One of the modules is the active module that performs the routing operations and communicates with the external environment. Another module acts as a standby module that is prepared to take over in the event that the active module fails. FIG. 2 is a flowchart illustrating the overall operations of a router embodiment that implements redundancy. According to process 200, a first information base associated with an active portion of the router is maintained (202). A second information base associated with the standby portion of the router is synchronized with the first information base (204). An output information base is generated using the second information base (206). In some embodiments, the output information base is generated as the router undergoes a switchover during which the active portion gives up its active role and the standby portion assumes the active role. As will be shown in more details below, this redundancy scheme allows a routing device to smoothly switch over without requiring reconfiguration.

Figure 3:
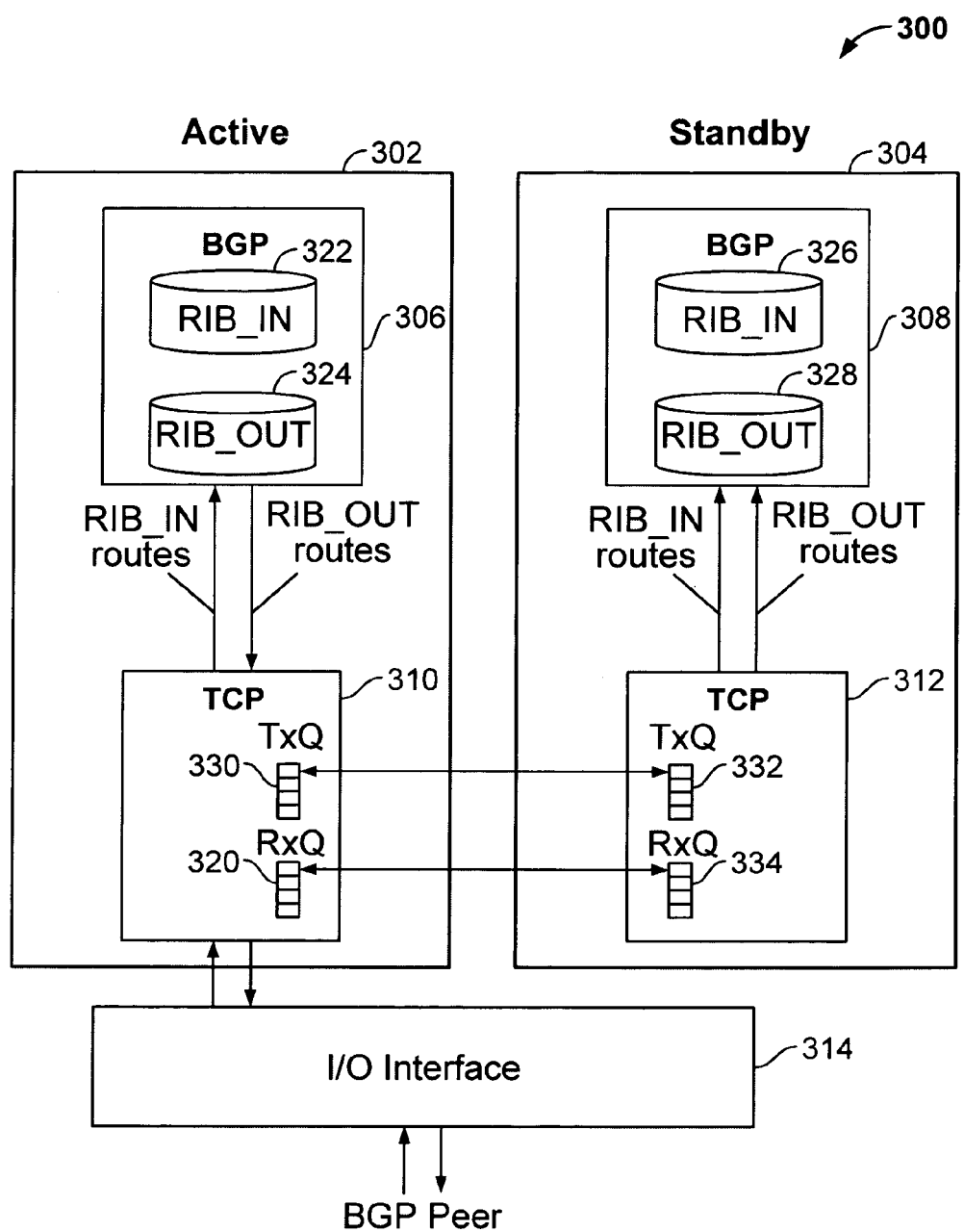
FIG. 3 is a block diagrams illustrating a routing device embodiment with redundancy.

FIG. 3 is a block diagrams illustrating a routing device embodiment with redundancy. In this example, routing device 300 includes an active control processing module (CPM) 302 and a standby CPM 304. A first input information base RIB_IN 322 associated with active CPM 302 is maintained. A second input information base RIB_IN 326 associated with standby CPM 304 is synchronized with the RIB_IN 322. An output information base RIB_OUT 324 is maintained on active CPM 302 to track routes shared by routing device 300 with one or more peers. During standby operation, an output information base RIB_OUT 328 on standby CPM 304 is synchronized as described more fully below with output information base RIB_OUT 324 on active CPM 302.

CPM 302 and CPM 304 each includes an application layer and a transport layer. For purposes of example, a BGP application is shown to operate in the application layer. The redundancy technique described herein is also applicable for other routing protocols such as Label Distribution Protocol (LDP). TCP processes 310 and 312 implement transport layer functions of CPMs 302 and 304, respectively. During normal operation, routing information received from peer routers is received on I/O interface 314, which forwards the data to active TCP module 310. Received data is buffered in TCP receive queue 320 temporarily and later transferred to BGP application 306. The routing information is stored in input route information base RIB_IN 322.

BGP application 306 regularly sends route information updates to routing devices that are peers of device 300. Outbound route information is stored in an output route information base, RIB_OUT 324. The output is sent to the transport layer, buffered in transmitted queue 330 as appropriate, and forwarded to peer routers via I/O interface 314. Although RIB_IN 322 and RIB_OUT 324 are shown separately in this example, they share the same data structure in some embodiments.

Standby CPM 304 includes the same components as CPM 302. During normal operation, standby CPM 304 and active CPM 302 cooperate to synchronize TCP transmit queue 332 with TCP transmit queue 330 and TCP receive queue 334 with TCP receive queue 320. RIB_IN 326 and RIB_OUT 328 are updated based on the contents of the TCP queues 332 and 334, as described more fully below. A switchover takes place in the event that CPM 302 fails. Since the route information base on standby CPM 304 is up-to-date, it can assume the active role of sending and receiving route information to and from peer devices with substantially little disruption to services. Details of the CPM operations are discussed below.

In some embodiments, the TCP stack is implemented using fixed sized queues that have queue entries of the same, fixed length. However, if the TCP layer allows variable sized packets to be transmitted, there is a possibility that the data in the active and standby queues may become out of synch when a switchover occurs. For example, in a system where the transmit queue size is fixed to 500 bytes, if the BGP application generates a 1000 byte packet for transmission, the TCP layer will divide the packet into two 500 byte portions. If a switchover occurs after the first 500 byte portion is transmitted but before the second 500 byte packet is sent, the standby CPM would not necessarily be aware of the partial transmission and may repeat the transmission of the first portion once it assumes the active role. To ameliorate this problem, the BGP and TCP processes in some embodiments are modified to only generate and transmit full packets between the two processes.

Figure 4:
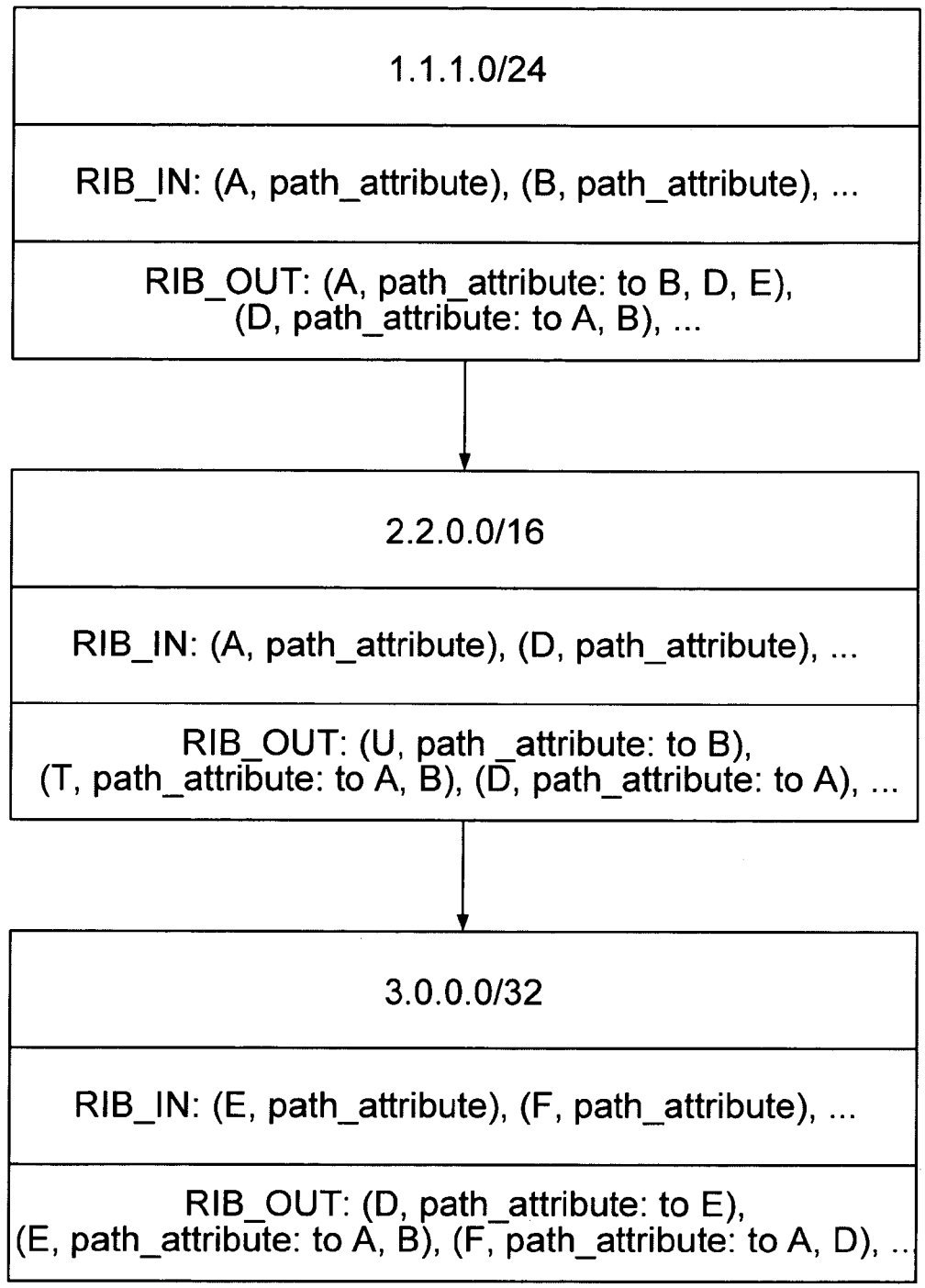
FIG. 4 is a diagram illustrating a data structure used to store route information according to some embodiments.

FIG. 4 is a diagram illustrating a data structure used to store route information according to some embodiments. In this example, information base (RIB) 400 is used by a BGP process in a router. Both RIB_IN and RIB_OUT are stored in RIB 400, which is implemented as a linked list. The RIB can also be implemented as a table, a tree, or any other appropriate data structure. In the example shown, each node of the linked list corresponds to a network comprising a range of addresses (e.g., 1.1.1.0/24, 2.2.0.0/16, etc.). The BGP process receives from peer routing devices (e.g. devices A and B) route information concerning destination that can be reached through such peers and stores the information including associated path attributes in RIB_IN. The path attributes may include information such as autonomous systems traversed to reach the destination via this route and a cost to reach the destination.

Figure 5:
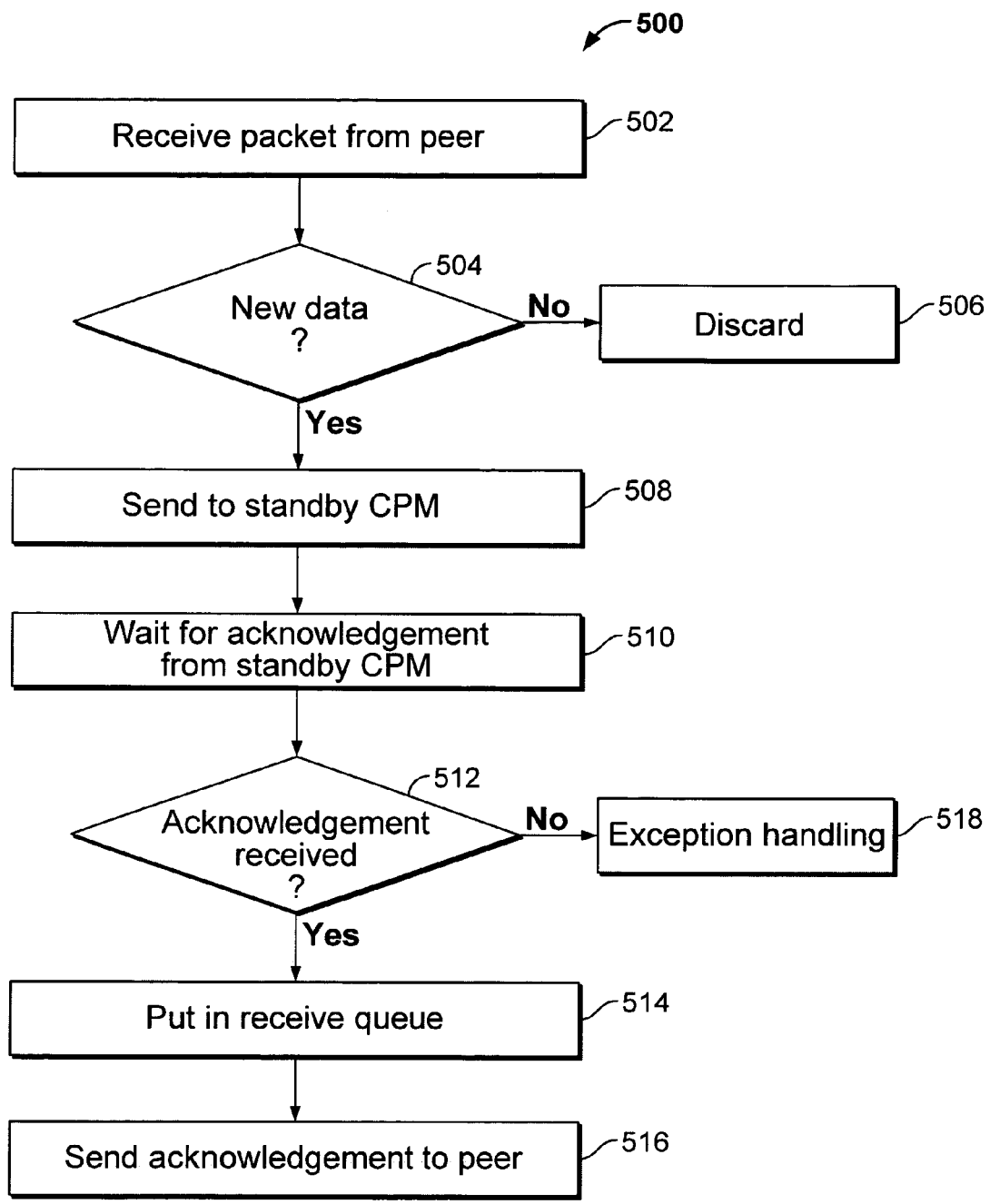
FIG. 5 is a flowchart illustrating the receive operation of an active CPM embodiment during normal operation.

The BGP process also sends route information to its peers. In some embodiments, a set of policies governs the transmission of the route information. For example, the policy may indicate that a peer device is allowed to receive route information from certain devices only, or that a peer device is only given routes with routing cost below a prescribed threshold. RIB_OUT keeps track of the devices to which routing information regarding a particular network is sent During normal operation (i.e., before a switchover occurs), the receive buffer of the standby CPM transport layer is synchronized with the receive buffer of the active CPM. FIG. 5 is a flowchart illustrating the receive operation of an active CPM during normal operation in an embodiment. In this example, operation 500 is performed by the TCP process on the active CPM. The process begins with the transport layer receiving a packet from a peer router (502). The packet may be new data that the device has never received before, or repeated data resent by a peer device. It is determined whether the packet received is new data (504). If the same data has been received previously, it is discarded (506). If, however, the data is new, it is then sent to the standby CPM (508).

In one embodiment, the TCP process of the standby CPM is configured to send an acknowledgment if the packet is received successfully. The active TCP process waits for the acknowledgment from the standby TCP process (510). It determines whether an acknowledgment is successfully received (512). If a proper acknowledgment is not received within a prescribed time, it indicates that the communication with the standby CPM has failed. Thus, the active CPM enters an exception handling mode (518). How exceptions are handled depends on system implementation. For example, the TCP data may be resent, the standby CPM may be rebooted, etc. If, however, the acknowledgment from the standby TCP process is properly received, the received data packet is put in the TCP receive queue (514). An acknowledgment is sent to the sending peer router, indicating that the TCP packet has been successfully received (516).

Figure 6:
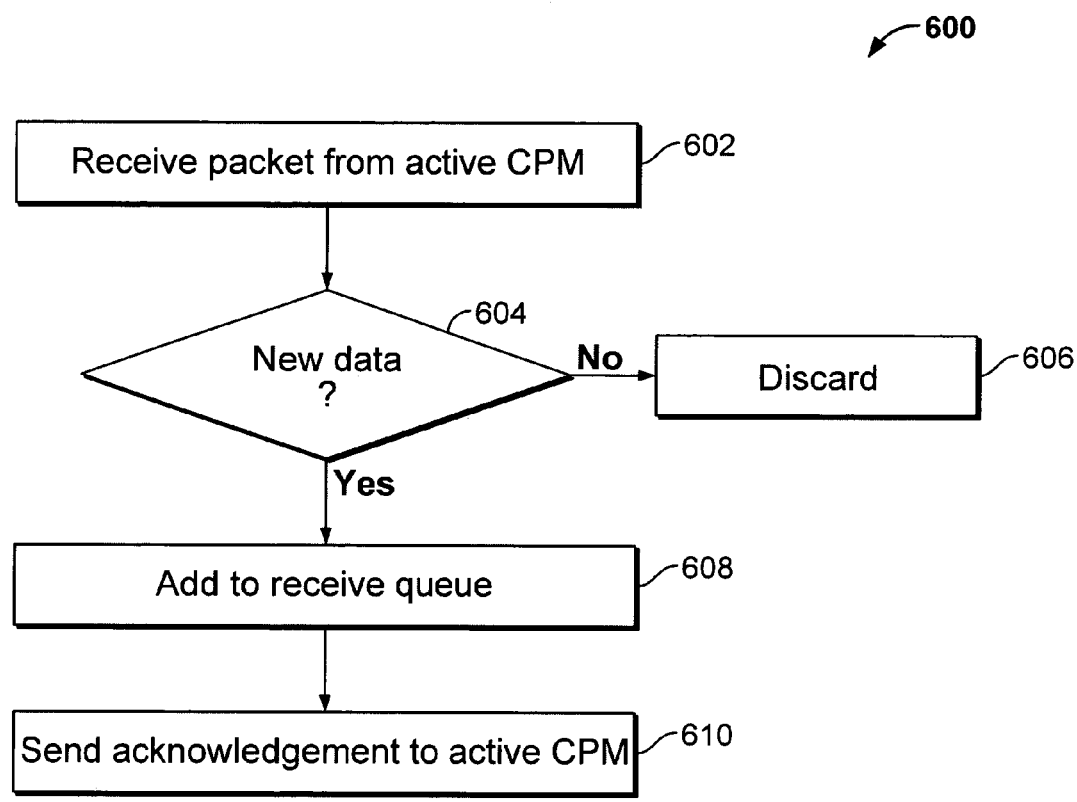
FIG. 6 is a flow chart illustrating the receive operation of a standby CPM embodiment during normal operation.

FIG. 6 is a flow chart illustrating the receive operation of a standby CPM during normal operation in an embodiment. In this example, operation 600 is performed by the TCP process on the standby CPM. When a data packet is received from the active CPM (602), it is determined whether the packet received is new data (604). If the same data has been received previously, it is discarded (606). If, however, the data is new, it is added to the TCP receive queue (608). An acknowledgment is sent to the active CPM (610). In addition, the BGP process on the standby CPM updates its RIB_IN by monitoring changes to the TCP receive queue, as described more fully below.

Figure 7:
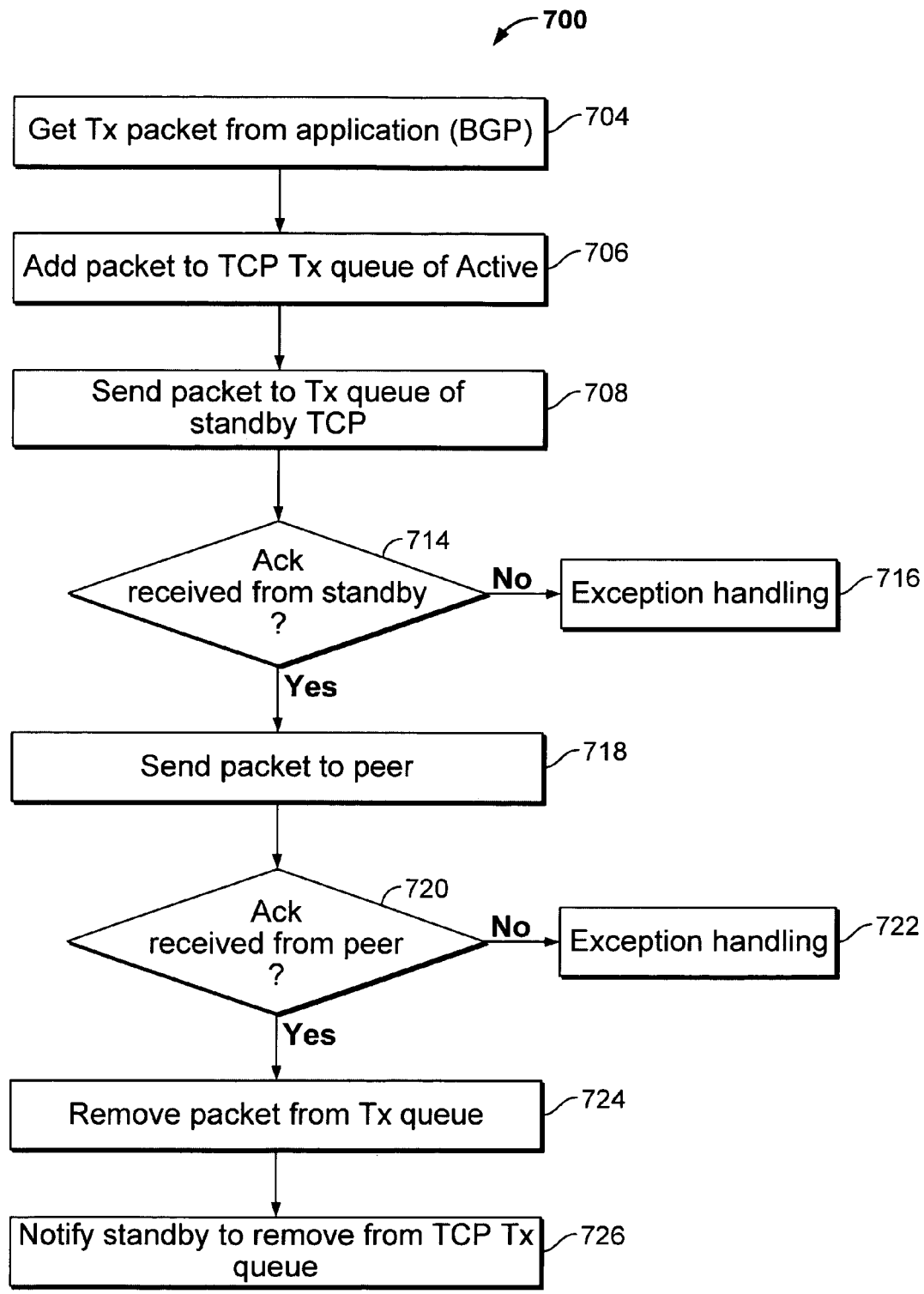
FIG. 7 is a flow chart illustrating the transmit operation of an active CPM embodiment during normal operation.

Similarly, the respective transport layer transmit buffers of the active and standby CPMs are also synchronized. FIG. 7 is a flow chart illustrating the transmit operation of an active CPM embodiment during normal operation. In this example, operation 700 is performed by the TCP process on the active CPM. When a higher level application running on the active CPM such as the BGP application sends a packet to a designated peer, the data packet is first received by the active TCP process (704). The packet is then added to the TCP transmit queue (706). The packet is then sent to the TCP transmit queue associated with the standby TCP process (708). It is determined whether an acknowledgment has been received from the standby TCP process (714). If the TCP acknowledgment is not received, it indicates an error or exception, which is handled by the active CPM appropriately (716). If an acknowledgment is properly received, the packet is sent to its designated peer (718). The process then waits for an acknowledgment from the peer. If the acknowledgment is not properly received (720), exception handling such as resending the packet is performed (722). If a proper acknowledgment is received from the peer (720), the packet is then removed from the TCP transmit queue (724), and the TCP process associated with the standby CPM is also notified to remove the same packet from its TCP transmit queue (726).

Figure 8A:
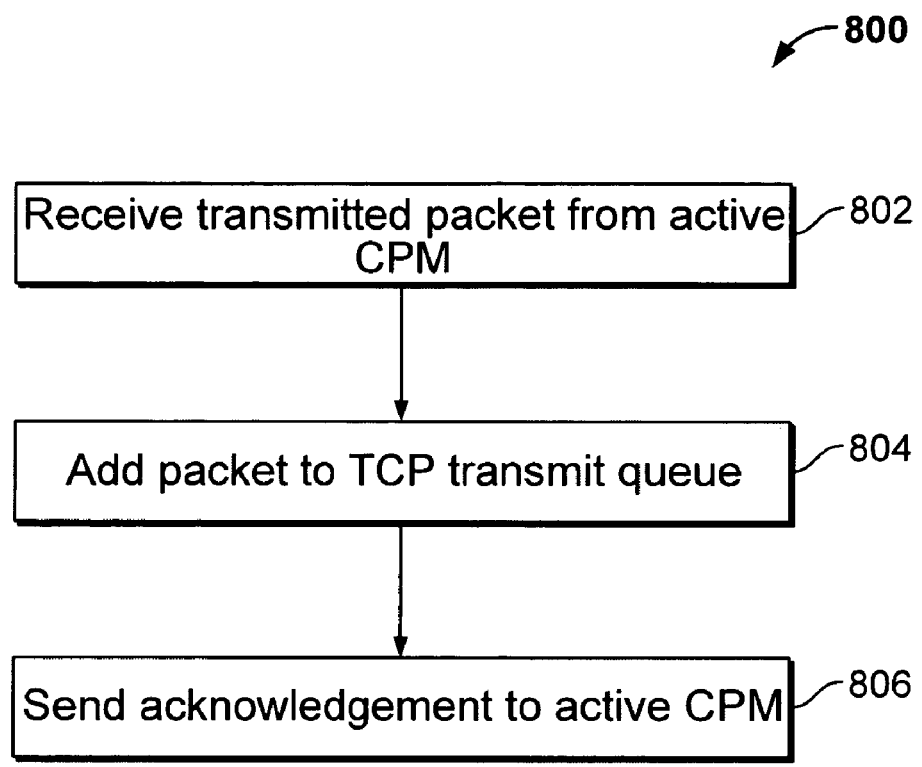
FIG. 8A is a flow chart illustrating the operation of a standby CPM embodiment during normal operation to process routes added to an active TCP transmit queue by an active CPM.
Figure 8B:
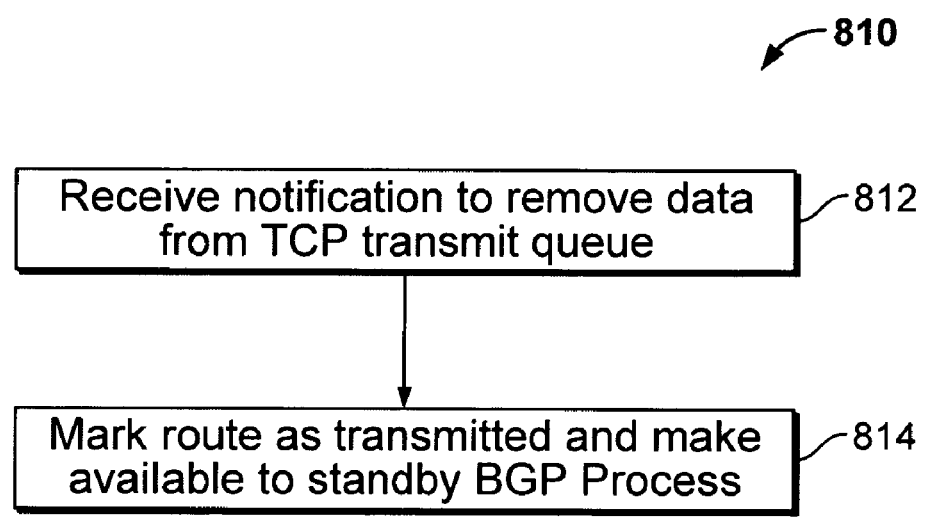
FIG. 8B is a flow chart illustrating the operation of a standby CPM embodiment during normal operation to process routes transmitted from a transmit queue by an active CPM.

As shown in operation 700, in the example shown the active CPM synchronizes packets designated for transmission with the standby CPM by sending the packet to the standby CPM before the packet is transmitted to the peer (708) and sending the standby CPM a notification to remove the packet after it is successfully transmitted to the peer (726). FIGS. 8A and 8B are flow charts illustrating the corresponding synchronization operations according to some standby CPM embodiments. In FIG. 8A, the standby CPM's TCP process begins operation 800 once a packet designated for transmission is received from the active CPM (802). The packet is added to the TCP transmit queue on the standby CPM (804). The packet includes route information and the address of the peer router to which the route information is sent. An acknowledgment is sent to the active CPM (806). In FIG. 8B, the standby CPM receives a notification to remove data from the TCP transmit queue (812). The standby CPM's TCP process marks the route information stored in the transmit queue as transmitted, and makes it available to the BGP process on the standby CPM (814). The standby CPM uses the transmitted routes to update the RIB_OUT database on the standby CPM, as described more fully below.

Figure 8C:
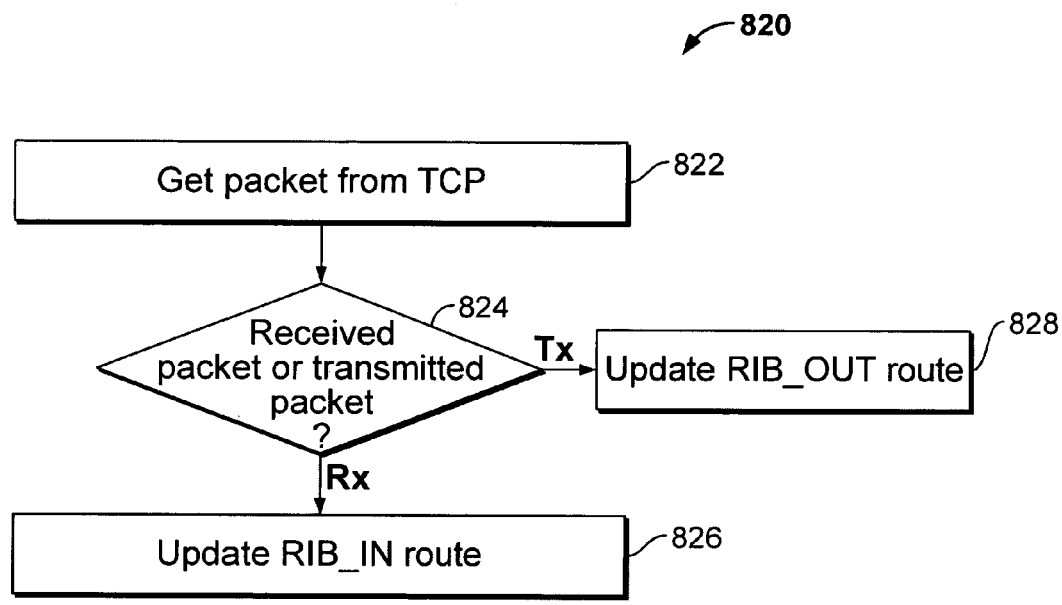
FIG. 8C is a flow chart illustrating the processing by a standby BGP process in one embodiment of packets received from a TCP process running on a standby CPM.

FIG. 8C illustrates a process used in one embodiment by a BGP application or process running on a standby CPM to process packets received from the TCP layer. In FIG. 8C, the BGP process gets a packet from one of the TCP queues (822). In some embodiments, the BGP process polls the TCP queues to determine whether there is data available, and retrieves all the data packets in the receive queue as well as any data packets in the transmit queue that are marked as having been successfully transmitted by the active CPM. In some embodiments, the standby TCP takes packets from the transmit queue as an indication that the packets have been transmitted by the active CPM, marks them as transmitted packets (to enable the standby BGP process to distinguish them from packets received from peers), and places them in the receive queue for deliver to the standby BGP process, which pulls packets from the receive queue for processing. In some embodiments, available packets are pushed to the BGP process. It then is determined whether the retrieved packet is a received packet (i.e., a route received from a peer) or a packet that has been transmitted by the active CPM (824). In some embodiments, the packet type is determined by a flag embedded in the packet. The TCP layer on the standby CPM is configured to set the flag based on whether the packet is from the TCP receive queue or the TCP transmit queue. In some embodiments, the packet type is determined according to the queue from which the packet is retrieved. If the packet is a received packet, the route information contained in the packet is used to update the RIB_IN list of the standby BGP process (826). If the packet is a transmitted packet, the route information contained in the packet is used to update RIB_OUT (828).

Figure 9:
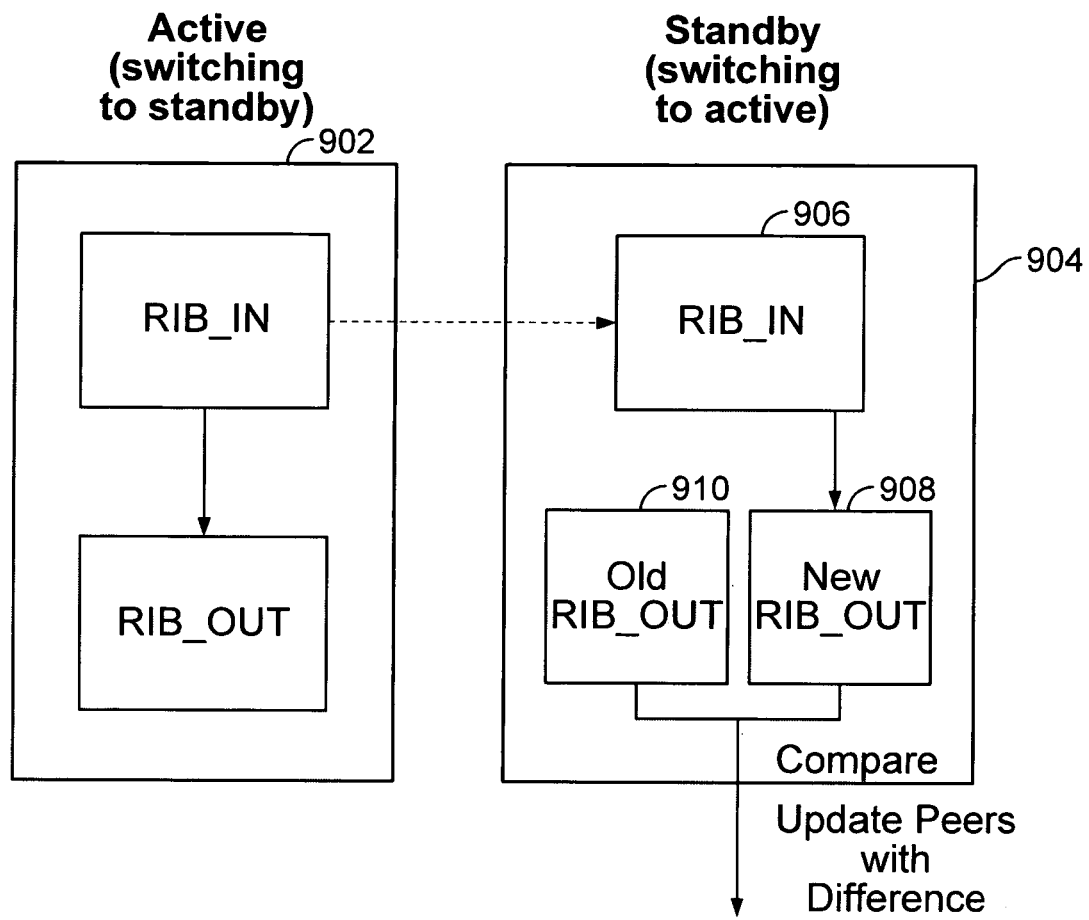
FIG. 9 is a diagram illustrating data structure changes during switchover, according to some embodiments.

During normal operation, RIB_IN and RIB_OUT of the standby BGP process are updated using the TCP queues on the standby module. Since the standby TCP queues are synchronized with the active TCP queues, RIB_IN and RIB_OUT associated with the standby BGP process are synchronized with RIB_IN and RIB_OUT associated with the active BGP process up to the point when a switchover occurs. In one embodiment, the updating of the RIB_IN and RIB_OUT lists on the standby CPM is configured to lag behind the corresponding updates on the active CPM to avoid having the standby CPM process a packet that causes the active CPM to crash. FIG. 9 is a diagram illustrating data structure changes during switchover, according to some embodiments. In this example, upon switchover notification, active BGP process 902 becomes inactive (e.g., switches to standby mode or becomes out of service, either intentionally as in the case of a hot swap for repair or other purposes or unintentionally due to equipment failure, etc.) and standby BGP process 904 switches to the active mode. Since there may have been policy changes (for example, certain routes may have become inaccessible, certain devices may no longer be allowed to receive route advertisement), errors in processing on the formerly active CPM, new routes received and/or shared, etc., that have not yet been reflected in the RIB_OUT list on the standby (now switching to active) CPM 904, the newly active BGP process 904 provides up-to-date route information to its peers by applying its current policies to RIB_IN 906 to generate a new RIB_OUT 908 (also referred to as a switched RIB_OUT). Switched RIB_OUT 908 is compared with old RIB_OUT 910 (i.e., the RIB_OUT list on the standby CPM as synchronized during standby operation as described above). The difference between the two is sent to peer devices as required. Since only those routes that are determined by this process of regenerating the RIB_OUT list and comparing it to the old RIB_OUT list to require update are sent, as opposed to resending all routes on the regenerated RIB_OUT list, peer devices communicating with this routing device will experience little service disruption when a switchover occurs.

Figure 10:
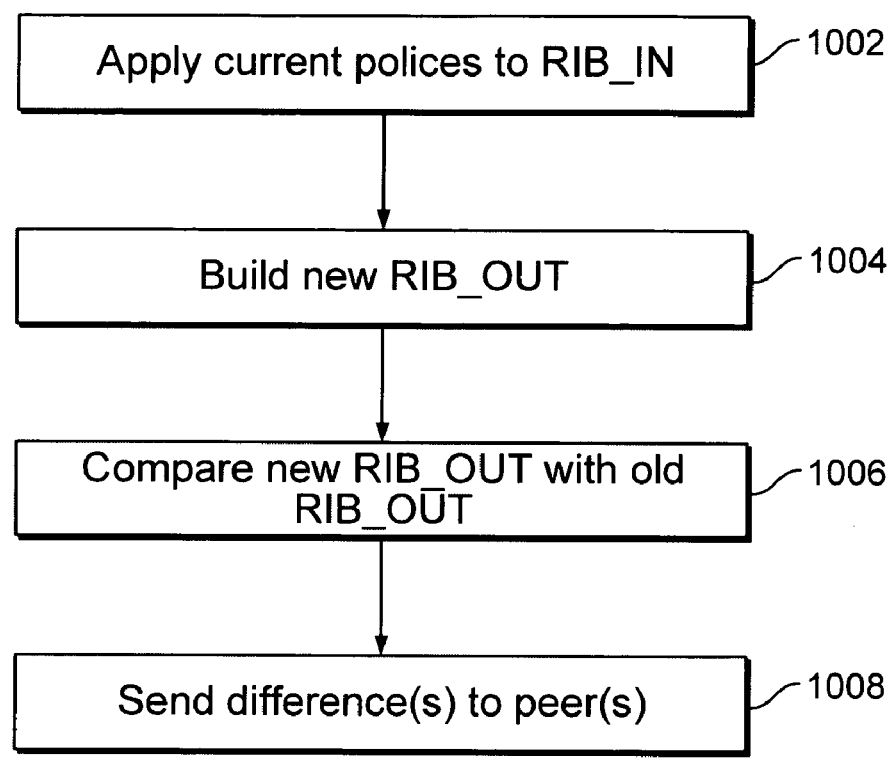
FIG. 10 is a flow chart illustrating the operations of a standby CPM embodiment after switchover.

FIG. 10 is a flow chart illustrating the operations of a standby CPM after switchover in an embodiment. In this example, a switchover has happened and the standby CPM is in the process of taking an active role. The BGP process on the CPM that is assuming the role of active CPM processes the RIB_IN list (1002) to generate a new RIB_OUT list based thereon (1004). The new RIB_OUT is then compared with the old RIB_OUT (1006), and any differences are sent to the applicable peer router(s) (1008). Some BGP implementations have a built-in function that automatically generates a new RIB_OUT list based on the RIB_IN list, compares the new RIB_OUT list to the previous RIB_OUT list, and notifies peers of any changes, e.g., upon policy changes. In some embodiments, this function is invoked during switchover to generate the new RIB_OUT and notify peers as required to account for any differences from the prior version, such as might be present if a policy change results in a previously advertised route no longer meeting the applicable criteria for being advertised.

The switchover process shown above allows the standby CPM to take over without having to re-broadcast all the available routes. For example, if an active CPM receives a route from a peer and successfully synchronizes the route with the standby CPM, then fails before it is able to send the route to other peers, the route will be included in the standby CPM's RIB_IN but not in its existing RIB_OUT. Once the standby CPM switches over and applies its current policy to the RIB_IN, the new RIB_OUT that results will include the route that has not been sent to peers. A comparison of the new RIB_OUT and the old RIB_OUT will show a difference indicating that this particular route has not yet been sent to the peers. Thus, the newly active CPM will send this new route to the appropriate peers.

The switchover process in some embodiments also allows for transparent switchover. Stated another way, from the perspective of the peer device, the routing device behaves normally even when there is a switchover.

If there has been a policy or other change that has resulted in a route shared previously by the formerly active CPM is no longer available or no longer satisfies criteria for being shared, the new RIB_OUT generated by applying the current policy to RIB_IN will not include this route. Thus, comparing the new RIB_OUT with the old RIB_OUT will show the difference and the newly active BGP will notify its peers that the route is no longer available.

Providing router redundancy has been disclosed. The techniques described herein are generally applicable to BGP applications as well as other routing applications. In some embodiments, RIB_IN and RIB_OUT may be maintained on both the active and the standby portions of the device, and shared by multiple applications such as LDP, and BGP to provide the processes with redundancy.

Although the foregoing embodiments have been described in some detail for purposes of clarity of understanding, the invention is not limited to the details provided. There are many alternative ways of implementing the invention. The disclosed embodiments are illustrative and not restrictive

What is claimed is:

1. A method of providing redundancy between an active component and a standby component in a network router, comprising:
    maintaining a first route input information base associated with the active component;
    synchronizing with the first route input information base a second route input information base associated with the standby component;
    maintaining a first route output information base associated with the active component;
    synchronizing with the first route output information base, a synchronized route output information base associated with the standby component;
    generating a route output information base associated with the standby component using the second route input information base associated with the standby component; and
    comparing the generated route output information base associated with the standby component in the event of switchover of the standby component to an active mode, to the synchronized route output information base associated with the standby component, which synchronized route output information base reflects routes known to have been shared with one or more peers by the active component prior to the switchover, and sharing and/or withdrawing routes as necessary to reflect any differences between the generated route output information base and the synchronized route output information base.

2. A method as recited in claim 1, wherein the active component includes an active routing application and the standby component includes a standby routing application.

3. A method as recited in claim 1, wherein the active component includes an active Border Gateway Protocol (BGP) application and the standby component includes a standby BGP application.

4. A method as recited in claim 1, wherein generating the route output information base occurs after switching the standby component to active.

5. A method as recited in claim 1, wherein generating the route output information base comprises applying a policy to the second route input information base.

6. A method as recited in claim 1, wherein the first and the second route input information bases include route information received from one or more peers.

7. A method as recited in claim 1, wherein the active component includes an active transmit control protocol (TCP) queue and the standby component includes a standby TCP queue; and the method further comprises synchronizing the standby TCP queue with the active TCP queue.

8. A method as recited in claim 7, wherein maintaining the second route input information base comprises monitoring the standby TCP queue and updating the second route input information base using the standby TCP queue.

9. A method as recited in claim 7, wherein the synchronized third route output information base is synchronized by monitoring the standby TCP queue and updating the synchronized route output information base using the standby TCP queue.

10. A method as recited in claim 7, further comprising receiving a packet from the standby TCP queue, determining whether the packet is (a) one received from a peer or (b) one transmitted by the active component, using the packet to update the second route input information base in the event it is determined the received packet is one received from a peer, and using the packet to update the synchronized route output information base in the event it is determined the received packet is one transmitted by the active component.

11. A method as recited in claim 7, wherein the active TCP queue and the standby TCP queue are fixed sized queues and an application associated with the active component is configured to send only whole packets.

12. A method as recited in claim 1, wherein the active component includes an active BGP application and the standby component includes a standby BGP application, and the method further comprises:
   switching the standby BGP application to active; and wherein:
      generating a route output information base associated with the standby component comprises generating a switched RIB_OUT;
      comparing the generated route output information base to a synchronized route output information base comprises comparing the switched RIB_OUT with a standby RIB_OUT associated with the standby BGP application; and
      sharing and/or withdrawing routes as necessary comprises sending the difference between the switched RIB_OUT and the standby RIB_OUT to one or more BGP peers.

13. A method as recited in claim 12, wherein the switched RIB_OUT is generated based on a standby RIB_IN associated with the standby BGP application.

14. A routing device comprising:
   an input/output interface configured to transmit and receive data;
   an active component coupled with the input/output interface, configured to maintain a first route input information base associated with the active component; and maintain a first route output information base associated with the active component;
   a standby component coupled with the input/output interface, configured to:
      maintain a second route input information base that is associated with the standby component and synchronized with the first input route information base;
      generate an output route information base using the second route input information base;
      maintain a synchronized route output information base associated with the standby component; and
      compare the generated route output information base, in the event of switchover of the standby component to an active mode, to the synchronized route output information base associated with the standby component which synchronized route output information base reflects routes known to have been shared with one or more peers by the active component prior to the switchover, and share and/or withdraw routes as necessary to reflect any differences between the generated route output information base and the synchronized route output information base.

15. A routing device as recited in claim 14, wherein the active component includes an active routing application and the standby component includes a standby routing application.

16. A routing device as recited in claim 14, wherein the active component includes an active Border Gateway Protocol (BGP) application and the standby component includes a standby BGP application.

17. A routing device as recited in claim 14, wherein the standby component is configured to generate the route output information base after switching the standby component to active.

18. A routing device as recited in claim 14, wherein the standby component is configured to generate the route output information base by applying a policy to the second route input information base.

19. A routing device as recited in claim 14, wherein the first and the second route input information bases include route information received from one or more peers.

20. A routing device as recited in claim 14, wherein the active component includes an active transmit control protocol (TCP) queue and the standby component includes a standby TCP queue; and the standby TCP queue is synchronized with the active TCP queue.

21. A routing device as recited in claim 20, wherein the standby component is configured to monitor the standby TCP queue and update the second route input information base using the standby TCP queue.

22. A routing device as recited in claim 20, wherein the standby component is configured to synchronize the synchronized route output information base by monitoring the standby TCP queue and updating the synchronized route output information base using the standby TCP queue.

23. A routing device as recited in claim 20, wherein the standby component is further configured to receive a packet from the standby TCP queue, determine whether the packet is (a) one received from a peer or (b) one transmitted by the active component, use the packet to update the second route input information base in the event it is determined the received packet is one received from a peer, and use the packet to update the synchronized route output information base in the event it is determined the received packet is one transmitted by the active component.

24. A routing device as recited in claim 20, wherein the active TCP queue and the standby TCP queue are fixed sized queues and an application associated with the active component is configured to send only whole packets of a size less than or equal to the size of the fixed size queues.

25. A routing device as recited in claim 14, wherein the active component includes an active BGP application and the standby component includes a standby BGP application, and the standby component is further configured to:
   switch to an active role;
   generate a route output information base by generating a switched RIB_OUT;
   compare the generated route output information base by comparing the switched RIB_OUT with a standby RIB_OUT associated with the standby BGP application; and
   share and/or withdraw routes as necessary by sending the difference between the switched RIB_OUT and the standby RIB_OUT to one or more BGP peers.

26. A routing device as recited in claim 25, wherein the switched RIB_OUT is generated based on a standby RIB_IN associated with the standby BGP application.

27. A computer program product for providing redundancy between an active component and a standby component, the computer program product being embodied in a computer readable storage medium and comprising computer instructions for:
   maintaining a first route input information base associated with the active component;
   synchronizing with the first route input information base a second route input information base associated with the standby component;
   maintaining a first route output information base associated with the active component;

synchronizing with the first route output information base, a synchronized route output information base associated with the standby component;

generating a route output information base associated with the standby component using the second input information base associated with the standby component; and comparing the generated route output information base associated with the standby component in the event of switchover of the standby component to an active mode, to the synchronized route output information base associated with the standby component which synchronized route output information base reflects routes known to have been shared with one or more peers by the active component prior to the switchover, and sharing and/or withdrawing routes as necessary to reflect any differences between the generated route output information base and the synchronized route output information base.

28. A computer program product as recited in claim 27, wherein the active component includes an active routing application and the standby component includes a standby routing application.

29. A computer program product as recited in claim 27, wherein the active component includes an active Border Gateway Protocol (BGP) application and the standby component includes a standby BGP application.

30. A computer program product as recited in claim 27, wherein generating the route output information base occurs after switching the standby component to active.

31. A computer program product as recited in claim 27, wherein generating the route output information base comprises applying a policy to the second route input information base.

32. A computer program product as recited in claim 27, wherein the first and the second route input information bases include route information received from one or more peers.

33. A computer program product as recited in claim 27, wherein the active component includes an active transmit control protocol (TCP) queue and the standby component includes a standby TCP queue; and the method further comprises synchronizing the standby TCP queue with the active TCP queue.

34. A computer program product as recited in claim 33, wherein maintaining the second route input information base comprises monitoring the standby TCP queue and updating the second route input information base using the standby TCP queue.

35. A computer program product as recited in claim 33, wherein the synchronized route output information base is synchronized by monitoring the standby TCP queue and updating the synchronized route output information base using the standby TCP queue.

36. A computer program product as recited in claim 33, further comprising computer instructions for receiving a packet from the standby TCP queue, determining whether the packet is (a) one received from a peer or (b) one transmitted by the active component, using the packet to update the second route input information base in the event it is determined the received packet is one received from a peer, and using the packet to update the synchronized route output information base in the event it is determined the received packet is one transmitted by the active component.

37. A computer program product as recited in claim 33, wherein the active TCP queue and the standby TCP queue are fixed sized queues and an application associated with the active component is configured to send only whole packets of a size less than or equal to the size of the fixed size queues.

38. A computer program product as recited in claim 27, wherein the active component includes an active BGP application and the standby component includes a standby BGP application, and further comprising computer instructions for:

switching the standby BGP application to active; and
wherein:
generating a route output information base comprises generating a switched RIB_OUT;
comparing the generated route output information base to a synchronized route output information base comprises comparing the switched RIB_OUT with a standby RIB_OUT associated with the standby BGP application; and
sharing and/or withdrawing routes as necessary comprises sending the difference between the switched RIB_OUT and the standby RIB_OUT to one or more BGP peers.

39. A computer program product as recited in claim 38, wherein the switched RIB_OUT is generated based on a standby RIB_IN associated with the standby BGP application.

* * * * *

UNITED STATES PATENT AND TRADEMARK OFFICE
CERTIFICATE OF CORRECTION

PATENT NO.        : 7,549,078 B2                                      Page 1 of 1
APPLICATION NO.   : 11/345259
DATED             : June 16, 2009
INVENTOR(S)       : Harvey et al.

It is certified that error appears in the above-identified patent and that said Letters Patent is hereby corrected as shown below:

Column 8, line 40 delete "the route" and insert -- the route --

Signed and Sealed this

Twenty-ninth Day of September, 2009

David J. Kappos
*Director of the United States Patent and Trademark Office*